United States Patent [19]
Oldershaw et al.

[11] 3,741,371
[45] June 26, 1973

[54] APPARATUS FOR INSPECTING AND SELECTING PRODUCTS

[75] Inventors: C. G. Peter Oldershaw, Avon; Don deKramer, Lima, both of N.Y.

[73] Assignee: General Foods Corporation, White Plains, N.Y.

[22] Filed: Feb. 4, 1971

[21] Appl. No.: 112,531

[52] U.S. Cl................ 198/38, 198/183, 209/90
[51] Int. Cl............................................ B65g 43/00
[58] Field of Search............... 209/90, 111.7, 73, 209/74, 111.6, 125; 198/45, 38, 183; 214/11 R, 11 C

[56] References Cited
UNITED STATES PATENTS

| | | | |
|---|---|---|---|
| 2,253,572 | 8/1941 | Mitchell.............................. | 198/38 |
| 3,060,794 | 10/1962 | Reading....................... | 209/111.7 X |
| 3,241,433 | 3/1966 | Wiederer, Jr. et al....... | 209/111.7 X |
| 1,996,535 | 4/1935 | Beck.................................... | 198/45 |
| 3,605,983 | 9/1971 | Oldershaw.......................... | 198/45 |
| 2,194,381 | 3/1940 | Cadman........................... | 214/11 R |
| 3,645,394 | 2/1972 | Goodale........................... | 214/11 R |

Primary Examiner—Allen N. Knowles
Attorney—Thomas V. Sullivan and Bruno P. Struzzi

[57] ABSTRACT

Apparatus for inspecting and selecting generally cylindrical products such as husked ears of corn. The apparatus comrpises conveyor means, in-feed regulating means, product rotating and translating means, mechanical memory means and product separating means. The apparatus is especially useful in the inspection of generally cylindrical products, typically agricultural commodities and specifically husked ears of corn, where it is desirable to examine all of the surface of individual units of such products and to divert selected products to a different path from that of the others.

6 Claims, 8 Drawing Figures

PATENTED JUN 26 1973

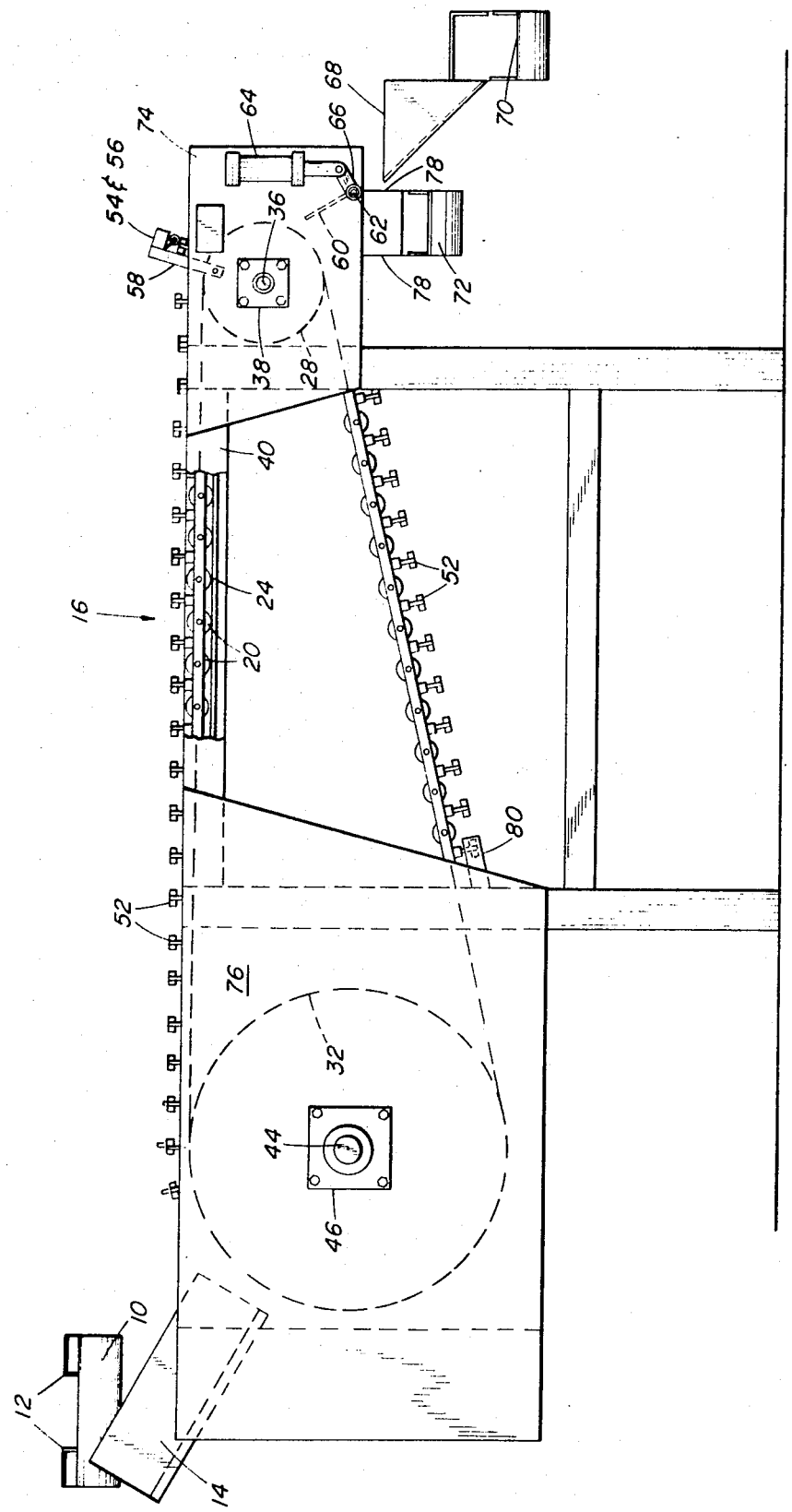

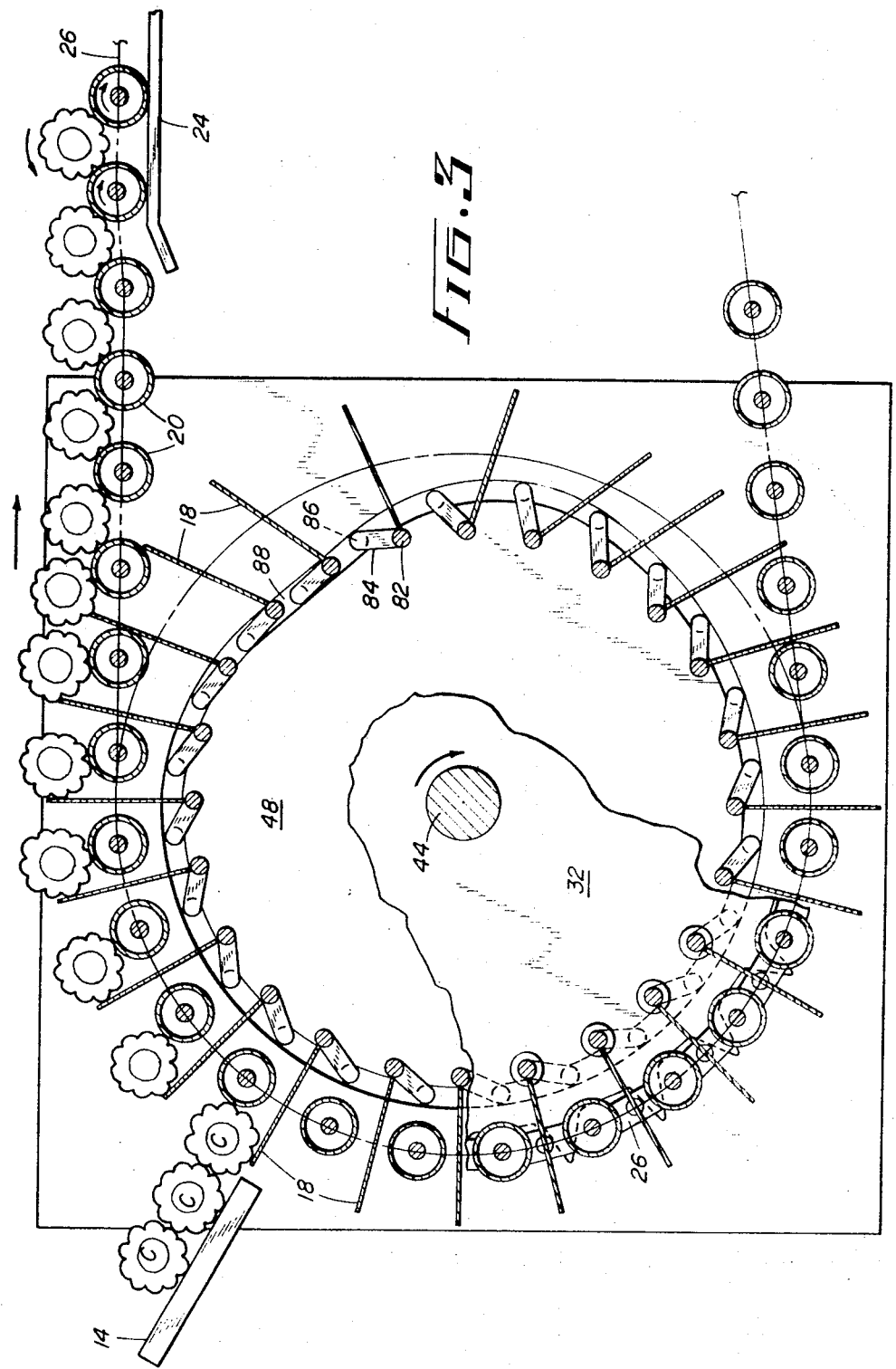

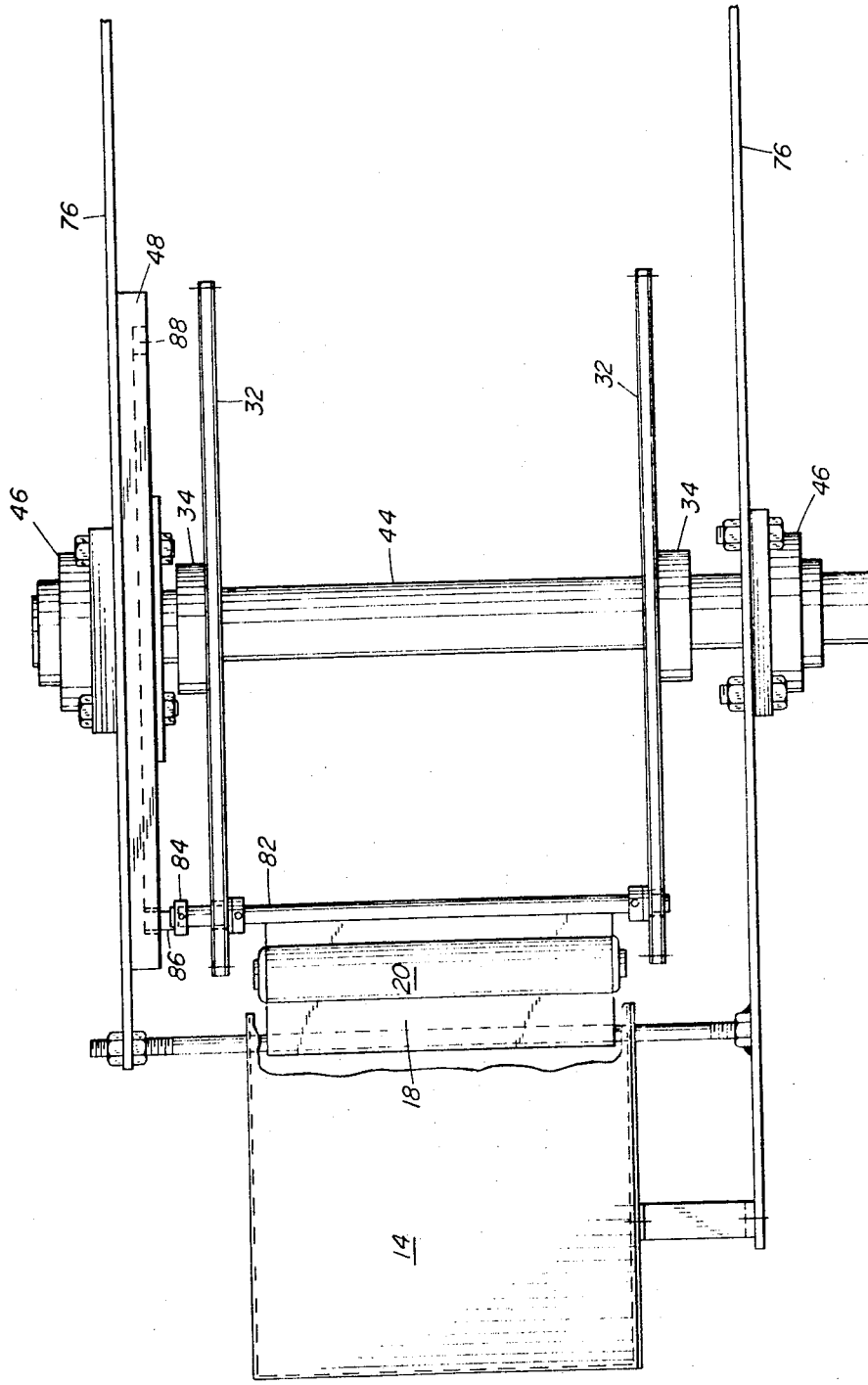

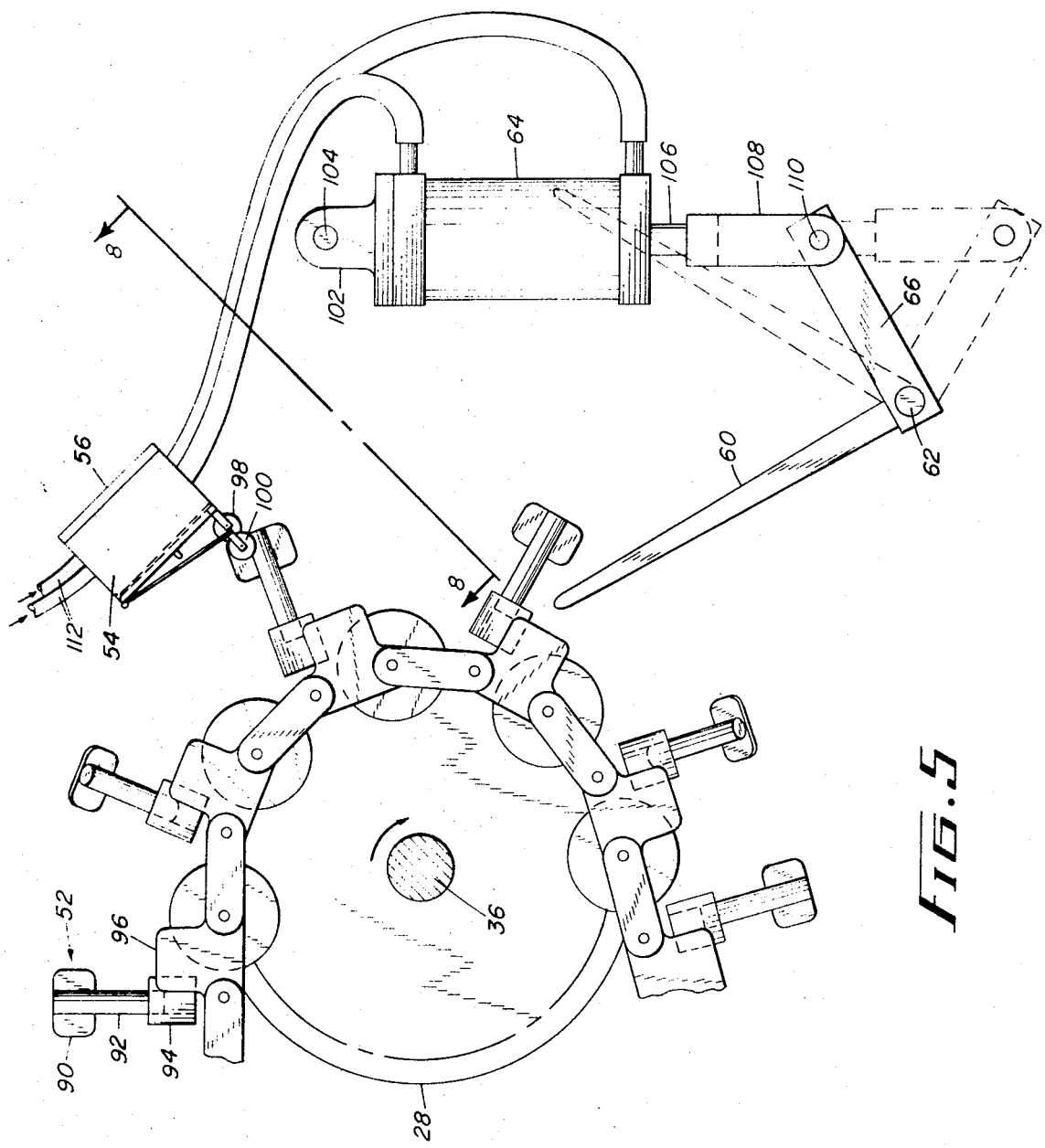

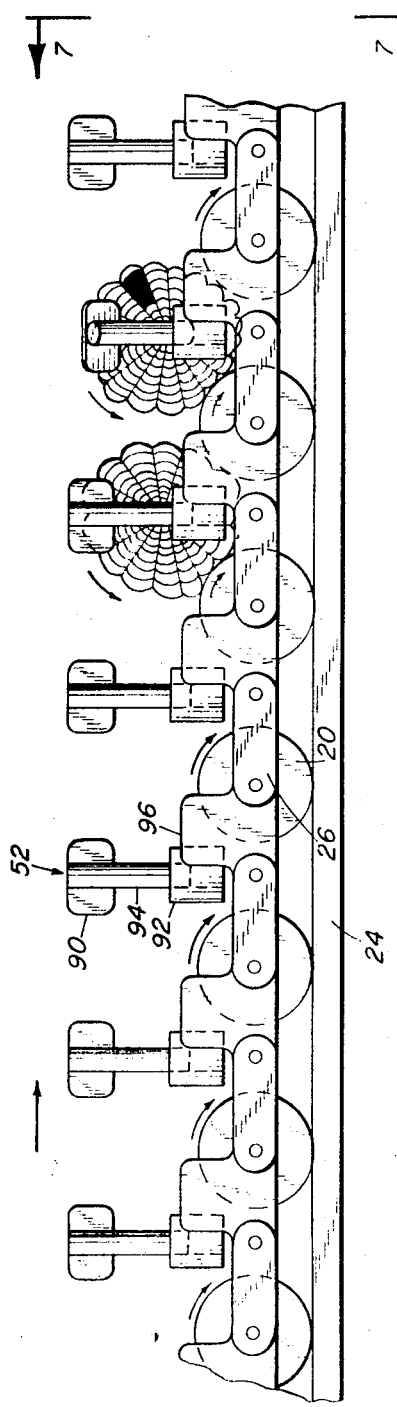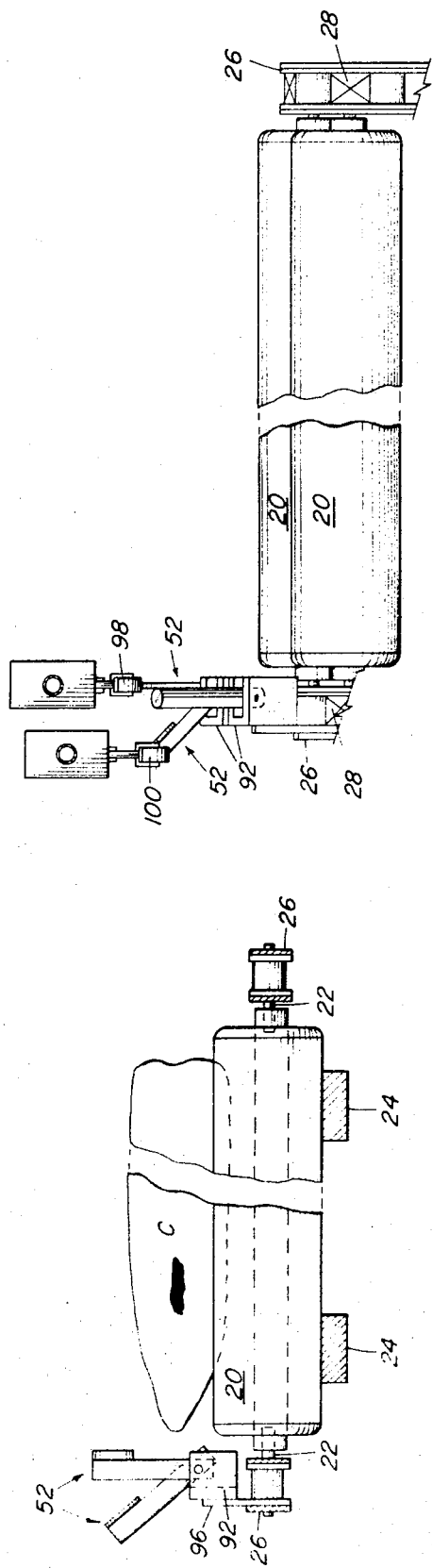

APPARATUS FOR INSPECTING AND SELECTING PRODUCTS

BACKGROUND OF THE INVENTION

In the large-scale processing of most agricultural commodities numerous inspection and selection stations are positioned along the process lines. Generally, a large number of inspection and selection personnel are required in order to separate and to segregate acceptable products from unacceptable products. Usually agricultural commodities such as corn, more specifically husked ears of corn, which are to be processed, are examined at several inspection and selection stations on a food processing line so as to adequately segregate acceptable ears of corn from unacceptable ears of corn. Acceptability may be on the basis of size, shape, or quality of the corn, e.g. the absence of damaged areas on the ears of corn. Usually, such ears are picked up and examined by the inspection and selection personnel from conveyors carrying the ears of corn past such stations, and the personnel following such examination thereafter segregate or select the acceptable ears of corn and divert the acceptable products from the unacceptable products. Frequently, the unacceptable ears of corn may be returned to the conveyor moving in front of, say, a first inspection and selection station and subsequently the unacceptable ear of corn will be inspected once again at, say, a second inspection and selection station and possibly a third and fourth such stations. Obviously, such method of inspection and selection leaves much to be desired from the point of view of efficiency and economy — particularly in the amount of labor required for processing huge amounts of ears of corn and other agricultural commodities. Although many kinds of machines and apparatus adapted for the inspection and selection of different products — specifically agricultural products — are well known, most of them require the inspector or operator to manually remove the unacceptable product from the group or batch of acceptable products. In other words, heretofore known inspection and selection machines and apparatus leave much to be desired in actually reducing the amount of hand labor required for inspection and selection of products, and more particularly, removal or segregation of unacceptable products from acceptable products. This is particularly so in the case of agricultural commodities and especially with ears of corn where the likelihood of damage to the kernels is acute.

It is an object of this invention to provide an apparatus useful for the inspection and selection of agricultural commodities and, more particularly, generally cylindrical agricultural products such as husked ears of corn.

It is a further object of the present invention to provide an apparatus for inspecting and selecting husked ears of corn whereby the entire surface may be exposed for visual inspection.

It is another object of this invention to provide an apparatus permitting examination of all of the surfaces of such agricultural commodities, typically husked ears of corn, and to allow for diversion of selected units to a different path from that of others.

It is a still further object of this invention to provide an apparatus which will accept husked ears of corn at an irregular rate and position them on conveyor means and product rotating means.

Yet another object of the present invention is to provide an apparatus by which the operator or inspector may discriminately select acceptable products from unacceptable products and divert the acceptable products to one path and the unacceptable products to another path, thereby permitting optimum efficiency and economy in the processing of such agricultural products.

Yet another object of the present invention is to provide an apparatus for inspecting and selecting agricultural products whereby the products may be examined and segregated without the necessity for manual removal or placement of the products onto or off the conveyor means, product rotating means, and product diverting means.

An additional object of the present invention is to provide an apparatus for inspecting and selecting agricultural products, which apparatus does not require large capital expenditures and yet is economical to maintain and service, while at the same time the apparatus permits large throughput of agricultural products.

The foregoing objects, as well as others, will become more apparent from the description hereinafter taken in conjunction with the accompanying drawings in which:

FIG. 2 is a side elevation of the apparatus;

FIG. 3 is a sectional view taken along line 3—3 of FIG. 1 and further illustrating an additional cutaway section of the apparatus as shown in FIG. 1;

FIG. 4 is a partial plan view of the apparatus illustrating in-feed regulating means and cam assembly;

FIG. 5 is a sectional view taken along line 5—5 of FIG. 1;

FIG. 6 is an enlarged view of a portion of the apparatus of the present invention illustrating the conveyor means, product rotating and translating means, and mechanical memory means;

FIG. 7 is an end elevation taken along line 7—7 of FIG. 6 of the conveyor means, product rotating and translating means, and mechanical memory means shown in FIG. 5, together with an illustration of the two positions of the mechanical memory means and an ear of corn to be inspected and selected;

FIG. 8 is a partial view taken along line 8—8 of FIG. 5, and illustrates the mechanical memory means in cooperation with control elements of the product separating means.

Figure 1:
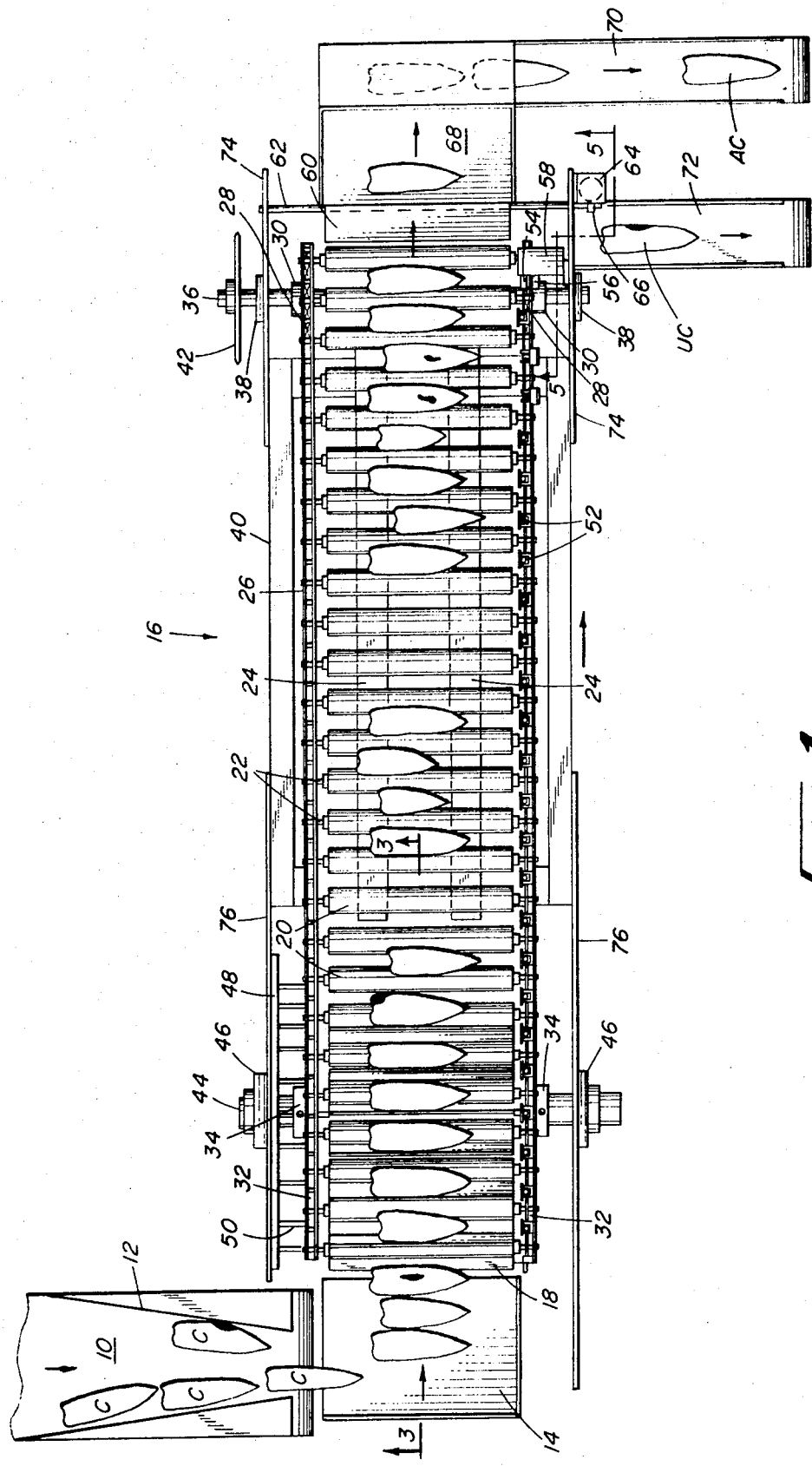
FIG. 1 is a plan view of the apparatus of the present invention showing thereon an agricultural commodity, typically ears of corn.

Referring to FIG. 1, in-feed conveyor 10 carries product, ears of corn "C," to be inspected and selected. The in-feed conveyor is provided with channeling guides 12 and the product is deposited onto inclined chute 14. As product "C" rolls down toward the conveyor means and product travel and rotating means, it is thereupon picked up by paddle 18 and is carried onto and over rollers 20, journaled on axles 22. The rollers 20, mounted on conveyor chain 26, travel over and roll on conveyor rails 24, thus causing rotation of product "C." The conveyor chains are driven by means of drive sprockets 28 having hubs 30 and tail sprockets 32 and having hubs 34. The drive shaft 36 is journaled in bearings 38 which are mounted on side frame members 74. Side frame members 74 are plate extensions attached to frame 40. The drive shaft is turned through drive sprocket 42 by means of chain and motor drive not shown. At the feed end of the apparatus, tail sprockets 32 are locked at their hubs 34 onto shaft 44 which is journaled in bearings 46 mounted on side frame members 76. Side frame members 76 are plate extensions attached to frame 40. Cam 48 and cam followers 50, shown here generally, act cooperatively to position the paddles 18 in the recesses between adjacent rollers 20. Mechanical memory means in the form of pivoted toggles 52 are positioned to contact limit switches 54 or 56 mounted on bracket 58 which is affixed to side frame members 74. Deflector plate 60 is attached to shaft 62, journaled in side frame member 74. The deflector plate is adapted as the means for separating acceptable from unacceptable products identified as "AC" and "UC." The product separating means further comprises air actuator 64 which rotates the deflector plate through crank 66. The acceptable products pass over chute 68 onto conveyor belt 70, while unacceptable products drop directly onto conveyor belt 72.

FIG. 2 shows elements not clearly seen in FIG. 1: product retaining members 78 and toggle plow 80. The toggle plow is provided to return all toggles to their upright position after one or more of the toggles have been depressed during operation of the apparatus.

FIG. 3 illustrates movement of product "C" down and from chute 14 onto paddles 18 and rollers 20. As seen herein, the paddles are affixed to shaft 82 journaled in sprockets 32. The shafts 82 are connected by crank arms 84 to cam followers 86. Cam 48 in conjunction with cam followers 86, travelling in cam slot 88, serves to deflect paddles 18 so as to withdraw the paddles from between the rollers 20 in the upper flight of the conveyor and to reintroduce the paddles between the rollers in the lower flight of the conveyor as the conveyor passes around toward the feed end of the machine.

FIG. 4 further typically depicts the arrangement whereby the cam follower 86 moving within cam slot 88 operates through crank arm 84 on shaft 82 to control the angular position of the paddle 18.

FIG. 5 further illustrates the operation of the mechanical memory means and product separating means. Toggles 52 are adapted for depression by the inspector or machine operator upon observation of an unacceptable product. The toggles 52 with toggle ears 90 and toggle stems 92 are pivotally attached within the slot of slotted mounting block 94 and the slotted mounted block is mounted onto chain attachment 96. Each toggle is associated with the gap or recess between adjacent rollers. As a toggle 52 passes over the drive sprocket 28, it contacts and depresses either roller 98 of limit switch 56 or roller 100 of limit switch 54. Actuation of the deflector plate 60 is controlled (by means of limit switch 54 or limit switch 56), operating cooperatively with air actuator 64 into which air from a supply source not shown passes through air hose lines 112. The air actuator 64 is pivotally mounted to the machine frame by means of clevis 102 and clevis pin 104. Depending upon the position of the toggles and their contacting either of the limit switches, the air actuator operating through piston rod 106 and clevis 108 and clevis pin 110, crank 66 positioned on shaft 62 will move deflector plate 60 toward the position for diversion of acceptable product or to a position for diversion of unacceptable product.

The operation of the machine during actual inspection and intermediate selection of products is well illustrated in FIG. 6, wherein an acceptable ear of corn is shown supported by adjacent rollers and an unacceptable ear of corn is shown similarly supported. As the inspector or operator of the machine observes the unacceptable product, toggle 52 opposite that product is depressed while the operator or inspector allows toggle 52 to remain in an upright position with respect to the acceptable product. Subsequently, as the undepressed and depressed toggles make contact with the limit switches, the diversion of acceptable product from unacceptable product takes place.

FIG. 7, portraying a front elevation along line 7—7 of FIG. 6, further illustrates the positions of toggles 52 in a depressed and undepressed condition.

FIG. 8 illustrates the contacting of the limit switch rollers 98 and 100 by toggles 52 in their depressed and undepressed condition.

The operation of the apparatus may be seen to be as follows:

Generally, the flow of the product is as shown in FIG. 1. Product enters from a conveyor perpendicular to the machine, slides or rolls down a chute, is picked up, conveyed past the inspector, and discharged to one of two alternate routes.

After the corn enters the in-feed chute from in-feed conveyor, it then slides and/or rolls down the chute, which is sloped to provide good downward travel without allowing product to become more than one ear deep. As each paddle and roller passes the chute discharge, an ear of corn is picked up by a paddle and then carried to the point at which the paddles recede from between the rollers, leaving the ear of corn resting in the "pocket" between two adjacent rolls.

As the rollers enter the inspection area, they become supported by and travel on the conveyor rails which rotate them and the corn resting on them. This allows an inspector to observe the entire surface of each ear of corn in looking for defects. As seen, a movable toggle is mounted on one conveyor chain opposite each "pocket" between adjacent rollers. If no defects are observed, the toggle is not touched and remains in an upright position. Upon observation of a defect, the inspector moves the toggle associated with the defective product to a depressed position.

At the discharge, a toggle, depending on its position, deflects the actuator of a corresponding limit switches which, by means of air cylinder moves the deflector to corresponding positions, thereby directing the falling corn to either one of two alternate routes. The limit switches are positioned so that the deflector is moved just prior to the fall of each ear of corn from its "pocket." The deflector remains in either position until it is actuated by a toggle in the other position.

An advantage of the apparatus is that the corn is held in orientation so that it can be fed to downstream equipment that requires oriented product.

The foregoing is considered and is to be understood as illustrative only of the principles of the present invention. Further, since numerous modifications and changes will be readily apparent to those skilled in the art, it is not desired to limit the invention to the exact construction, details, and operations shown and described. Accordingly, various modifications and changes can be made within the scope of the invention as defined in the appended claims.

We claim:

1. Apparatus for inspecting and selecting generally cylindrical products comprising, in combination:
   infeed regulating means for said products,
   conveyor means adapted to receive said products from said infeed means,
   means for rotating and translating said products associated with said conveyor means,
   mechanical memory means mounted on said conveyor means and adapted to be activated when said products are observed on said rotating and translating means, and
   means for separating said products activated by said mechanical memory means.

2. Apparatus according to claim 1 in which said conveyor means and means for rotating and translating said products are a roller conveyor and conveyor rails mounted on a frame over which the conveyor rolls pass.

3. Apparatus according to claim 2 in which said infeed regulating means comprises paddles parallel to the axis of said conveyor rolls and which are adapted by cam movement to pass between adjacent rolls.

4. Apparatus according to claim 3 in which said means for separating said products include limit switches and means for diverting said products from said conveyor means.

5. Apparatus according to claim 4 further comprising discharge conveyor means associated with said means for diverting said products for receiving said products after they have been inspected and selected.

6. Apparatus according to claim 5 further comprising a belt conveyor and an inclined chute for feeding said products to said infeed regulating means.

* * * * *